United States Patent [19]

Yuasa

[11] Patent Number: 4,465,354

[45] Date of Patent: * Aug. 14, 1984

[54] SYSTEM AND METHOD FOR CALCULATING A LIGHT INFORMATION VALUE

[75] Inventor: Yoshio Yuasa, Kawachinagano, Japan

[73] Assignee: Minolta Camera Kabushiki Kaisha, Osaka, Japan

[ * ] Notice: The portion of the term of this patent subsequent to Oct. 12, 1999 has been disclaimed.

[21] Appl. No.: 402,813

[22] Filed: Jul. 28, 1982

Related U.S. Application Data

[63] Continuation of Ser. No. 8,334, Jan. 31, 1979, Pat. No. 4,353,629.

[30] Foreign Application Priority Data

Feb. 7, 1978 [JP] Japan .................................. 53-13287

[51] Int. Cl.³ .......................... G03B 17/18; G01J 1/42
[52] U.S. Cl. .................................... 354/426; 354/465; 356/223

[58] Field of Search .............. 354/23 D, 24, 53, 60 R, 354/60 A, 60 E, 60 L, 127, 128, 425, 426, 465, 475; 356/215, 223, 226; 250/214 P; 235/64.7; 364/525, 526, 722, 857; 307/492; 328/145; 324/132

[56] References Cited

U.S. PATENT DOCUMENTS

| | | | |
|---|---|---|---|
| 3,523,740 | 8/1970 | Peter et al. ......................... | 356/215 |
| 3,552,862 | 1/1971 | Weinberg ........................... | 356/215 |
| 3,909,137 | 9/1975 | Kisanuki ............................ | 356/223 |
| 4,029,421 | 6/1977 | Sakaruda et al. .................. | 356/223 |

*Primary Examiner*—William B. Perkey
*Attorney, Agent, or Firm*—Wenderoth, Lind & Ponack

[57] ABSTRACT

A system disclosed is for calculating a light information value, such as an f/stop number, which is determined by a number of light sources such as strobes. The system calculates an optimum f/stop number for each of the strobes as the strobes are fired one after another and, at the same time, calculates after each firing of the strobe an optimum f/stop number for the strobes which have been fired. The optimum f/stop number for the plurality of strobes fired at the same time is displayed.

20 Claims, 9 Drawing Figures

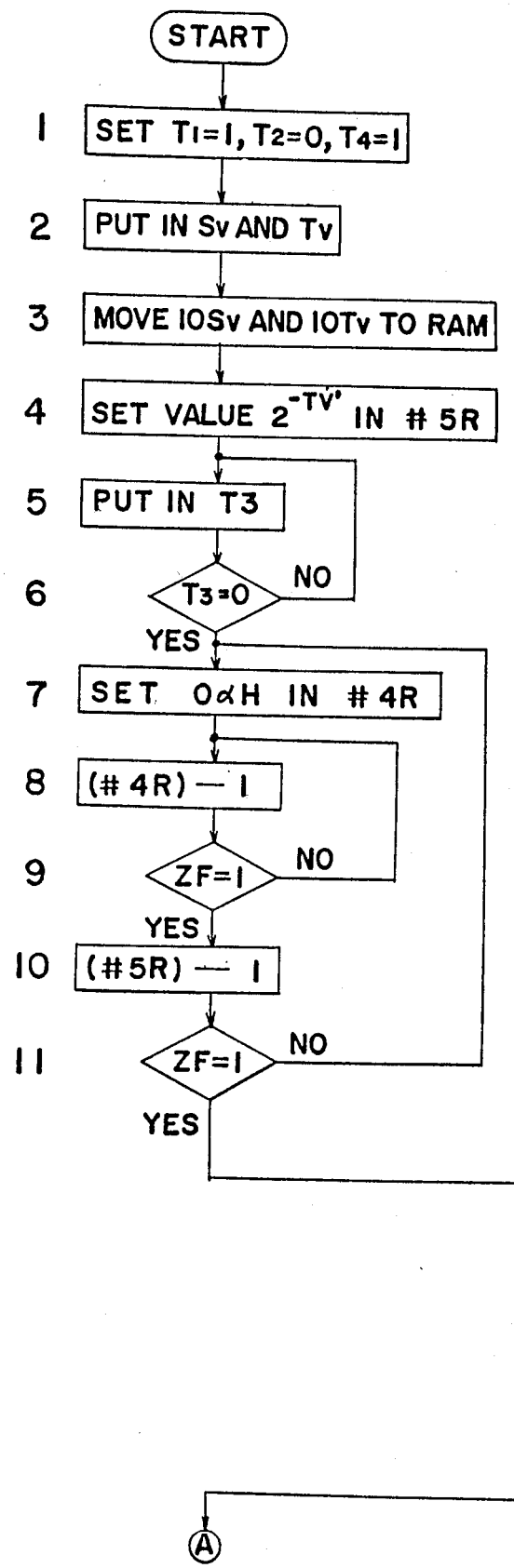
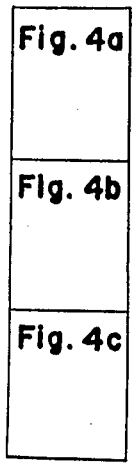
Fig. 4a
Fig. 4

SYSTEM AND METHOD FOR CALCULATING A LIGHT INFORMATION VALUE

CROSS-REFERENCE TO RELATED APPLICATIONS

This application is a continuation of U.S. application Ser. No. 8,334, filed Jan. 31, 1979, now U.S. Pat. No. 4,353,629, issued Oct. 12, 1982.

BACKGROUND OF THE INVENTION

The present invention relates to a system for use in a photographic device such as a camera for calculating a light information value such as an f/stop number or shutter speed relative to a number of pieces of independent light information involved in taking one photograph.

When taking a photograph with a plurality of light sources such as strobes, it is necessary to calculate an optimum f/stop number for the total brightness resulting from the strobes being fired at the same time for taking one photograph. For this purpose, in a conventional system, the strobes are successively fired for measuring, at first, the light value (brightness times flashing time) of an object to be photographed from the lighting of each strobe, and then, the total light value is calculated by the use of a known system which is a so-called additive system of photographic exposure, being abbreviated as the APEX system. This total light value is used for further calculating through the APEX system the optimum f/stop number for a photograph to be taken with a plurality of strobes actuated at substantially the same time. A similar calculation stop has been necessary for taking a multiple exposure photograph.

Conventionally, a device for calculating the optimum exposure value on the basis of the above described system has employed a capacitor which accumulates an electric charge corresponding to the light value as the plurality of strobes are lighted sequentially.

However, the device and system of the above described type has disadvantages such as that the capacitance of the capacitor must be quite large for preventing the capacitor from being saturated at a rather low charge, thus, so that a large size capacitor is required. Furthermore, a capacitor with a large capacitance is not appropriate for precise measurement, since the degree of change in the charged voltage is very small for small light values. Therefore, the preciseness of the light measurement is reduced. In addition, where the time interval between the times of lighting of the strobes is quite long, the charge on the capacitor may leak off more or less during said time interval, resulting in a failure to obtain a precise calculation.

Accordingly, it is an important object of the present invention to provide a system which precisely calculates the exposure value without any failure.

It is also an important object of the present invention to provide a device which operates according to the system of the above described type.

SUMMARY OF THE INVENTION

In accordance with a preferred embodiment of the invention, a system for calculating the sum of logarithmic values for a plurality of pieces of light comprises means for producing a first signal indicative of a logarithmic value of one piece of light information, means for memorizing a second signal and means for comparing the first signal with the second signal and for producing a third signal indicative of the difference therebetween. The system further comprises means responsive to the third signal for calculating and producing a fourth signal indicative of the calculated value through a predetermined formula and means for adding the fourth signal with a larger one of the first and second signals. The sum obtained from the adding means is applied to the memorizing means for renewing the second signal.

In accordance with a preferred embodiment of the invention, the formula is $\log_2(1+2^N)$ in which N is the difference between the first and second signals. For carrying out the calculation of the formula described above, the third signal is classified into a plurality of classes for mating the third signal with a value previously arranged in each class.

In accordance with a preferred embodiment of the invention, the system further comprises means for discriminating which one of the first and second signals is larger and means for defining which one of the first and second signals is to be subtracted from the other.

The system of the present invention is not limited to use in calculating one of the values given by the APEX system, but also can be used for calculating a rate of intensity among the three principle colors.

BRIEF DESCRIPTION OF THE DRAWINGS

These and other objects and features of the present invention will become apparent from the following description taken in conjunction with preferred embodiments thereof with reference to the accompanying drawings, in which:

FIG. 4 shows how FIGS. 4a, 4b, and 4c fit together.

FIGS. 4a, 4b and 4c taken together are a flow chart for carrying out the calculation according to the system shown in FIG. 1;

DETAILED DESCRIPTION OF THE INVENTION

Figure 1:
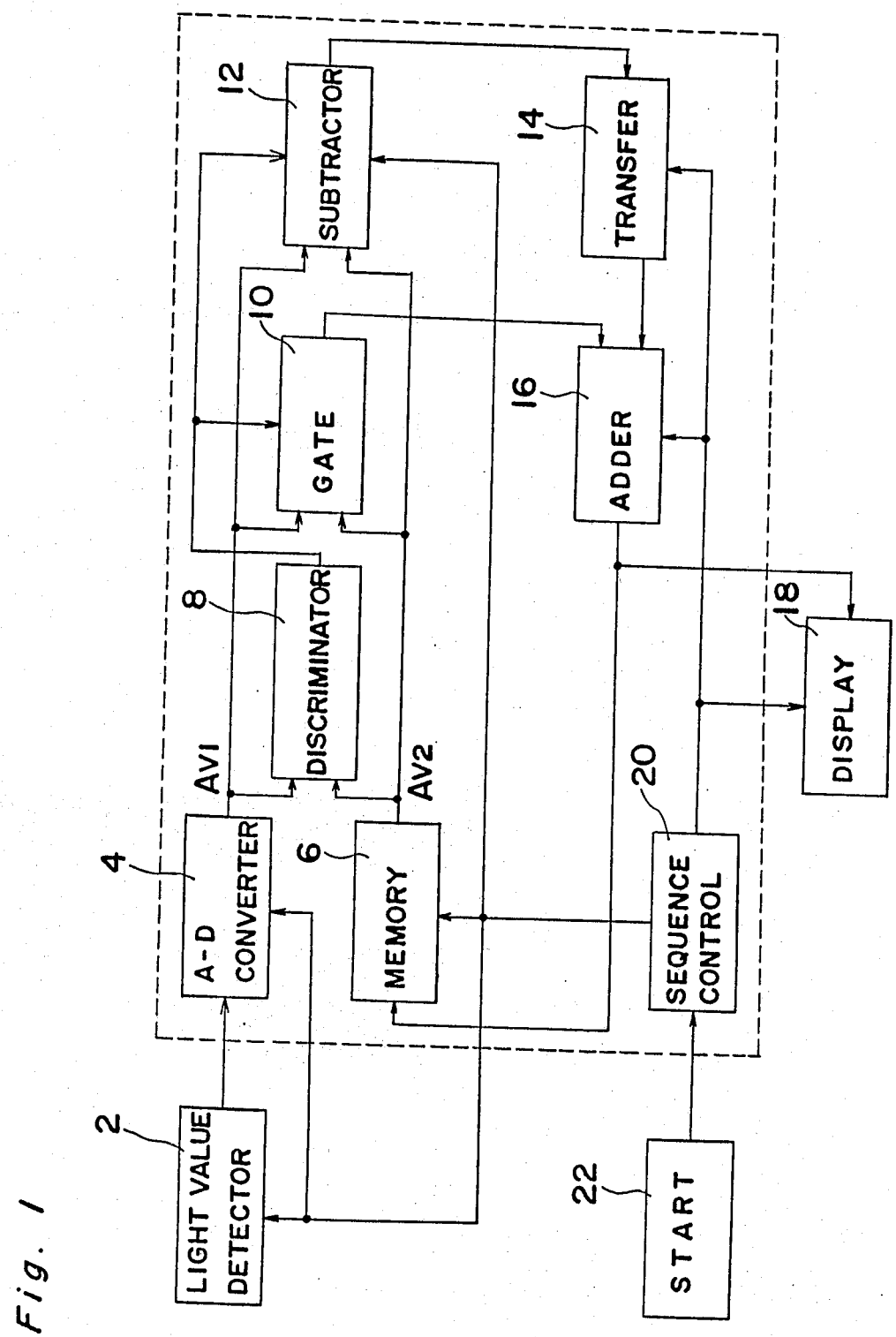
FIG. 1 is a block diagram of an exposure value calculating system of the present invention.

Before the description of the present invention proceeds, the additive system of photographic exposure (APEX system) will be described.

Generally, in photography, there is a close relation among the factors of: brightness or luminance of an object; sensitivity of a film; shutter speed; and size of an aperture. According to the APEX system, the relation can be expressed as follows:

$$Av + Tv = Sv + Bv = EV \tag{1}$$

in which Av is the APEX value of the aperture, Tv is the APEX value of the shutter speed, Sv is the APEX value of the film sensitivity, Bv is the APEX value of the luminance or brightness, and EV is the exposure value. Each of the APEX values is the logarithmic value of the well known values. More particularly, $Av = 2 \cdot \log_2 F$ in which F is an f/stop number, $Tv = \log_2$ ($1/T$) in which T is the shutter speed, $Sv = \log_2 (NS)$ in which N is a constant value and S is the film sensitivity such as the ASA number, and $Bv = \log_2 (B/NK)$ in which B is the brightness and K is a constant value.

In case of strobe photography, however, equation (1) is not applicable since Bv changes during photography. Substitutionally, the following equation (1)' is descriptive of the case of strobe photography:

$$Av = Sv + Qv \qquad (1)'$$

wherein Qv represents the logarithm of the integrated total value of the light which is emitted during one flashing of the strobe. Although the use of "Qv" is not conventionally used in the APEX system, "APEX value Qv" related with Av and Sv by equation (1)' is useful for discussing the determination of Av for strobe photography. "APEX value Qv" superficially corresponds to (Bv − Tv) as is apparent from a comparison of equations (1) and (1)'.

In strobe photography, the employment of one particular film automatically provides the APEX value Sv of the film sensitivity, while the employment of one particular strobe set at a particular position automatically provides the APEX value Qv. With the above described exposure information, the APEX value Av of the aperture can be obtained by using the equation (1)'.

In the case where a plurality of strobes set at different places are employed, each strobe provides its own APEX value Qv. Thus, one APEX value of aperture can be calculated for each flash of the strobe by using the equation (1)'. According to the APEX system, when a plurality of strobes are used for taking one photograph, the APEX value Avx of aperture effective for the combination of all the strobes lighted for taking one photograph can be obtained by the following equation:

$$2^{Avx} = \sum_{i=1}^{n} 2^{Avi} \qquad (2)$$

in which Avi is the APEX value of the aperture for any one of the strobes. It is to be noted that for taking one photograph, all the strobes can be lighted at once or sequentially in the manner of a multiple exposure. Therefore, for obtaining the total APEX value avx, the strobes are lighted one after another for measuring the APEX value Av for each strobe and for calculating the total APEX value by using the equation (2). According to the present invention, for carrying out the calculation of equation (2), a newly measured and calculated value $2^{Av2} = 2^{Avn}$ is added to the previously measured and calculated value $$2^{Av1} = \sum_{i=1}^{n-1} 2^{Avi}.$$ Therefore, from the equation (2), $$2^{Avx} = \sum_{i=1}^{n-1} 2^{Avi} + 2^{Av1} + 2^{Av2}. \qquad (3)$$

when $Av1 \geq Av2$, it is defined that $$2^{Av2}/2^{Av1} = 2^N \qquad (4).$$

Therefore, $$Av2 - Av1 = N \qquad (5).$$

From the equations (3) and (5), $$2^{Av1}(1 + 2^N) = 2^{Avx} \qquad (6).$$

Taking the logarithmic values of the equation (6), $$Av1 = \log_2 (1 + 2^N) = Avx \qquad (7).$$

Thus, the above equation (7) automatically gives the total APEX value Avx, provided that $Av1 \geq Av2$. On the other hand, when $Av1 \leq Av2$, it is defined that $$2^{Av1}/2^{Av2} = 2^M \qquad (8).$$

Therefore, $$Av1 - Av2 = M \qquad (9).$$

From the equations (3) and (9), $$Av2 + \log_2 (1 + 2^M) = Avx \qquad (10).$$

Thus, the above equation (10) automatically gives the total APEX value Avx, provided that $Av1 \leq Av2$.

According to the present invention, the total APEX value Avx can be obtained by the sum of APEX value Av1 or Av2, whichever is the larger, and the logarithmic value of $(1 + 2^N)$ or $(1 + 2^M)$ in which N or M is the difference obtained by the subtraction of the larger one of Av1 and Av2 from the smaller one of Av1 and Av2. In other words, the values N and M are negative values.

The systems of the present invention will now be described hereinbelow.

Referring to FIG. 1, there is shown a block diagram of a system for calculating an exposure value based on the APEX system. The calculation system comprises a light value detector 2 which produces an analog signal indicative of the logarithmic value of the light value of the object. An analogdigital converter 4 (hereinafter referred to as an A-D converter) is connected to the light value detector 2 for converting the analog signal into a digital signal corresponding to the APEX value Av1 which is to be processed in a micro-computer. A memory 6 is provided for storing the APEX value Av1 obtained from the previous operation.

A discriminator 8 discriminates which is the larger of the two signals produced respectively from the A-D converter 4 and memory 6 and generates a gate 10 to transmit the larger signal to an adder 16 and, at the same time, for actuating a subtractor 12 to subtract the larger signal from the smaller signal. The difference signal obtained from the subtractor 12 is applied to a transfer 14 in which the difference value N or M is used for calculating a transferred value $\log_2 (1 + 2^N)$ or $\log_2 (1 + 2^M)$. The adder 16 adds the signal obtained from the gate 10 and the signal obtained from the transfer 14 for producing the sum thereof. The three obtained sum is applied to the memory 6 in which the signal contained therein is renewed by the sum. A display 18 is coupled to the adder for displaying the summed value. A sequence control 20 is provided for sequentially controlling and operating the light meter 2, A-D converter 4, memory 6, subtractor 12, transfer 14, adder 16 and display 18, upon receipt of a start signal from a start circuit 22. In the calculating system, a micro-computer is employed for carrying out the operations of the elements encircled by the dotted line.

Figure 2:
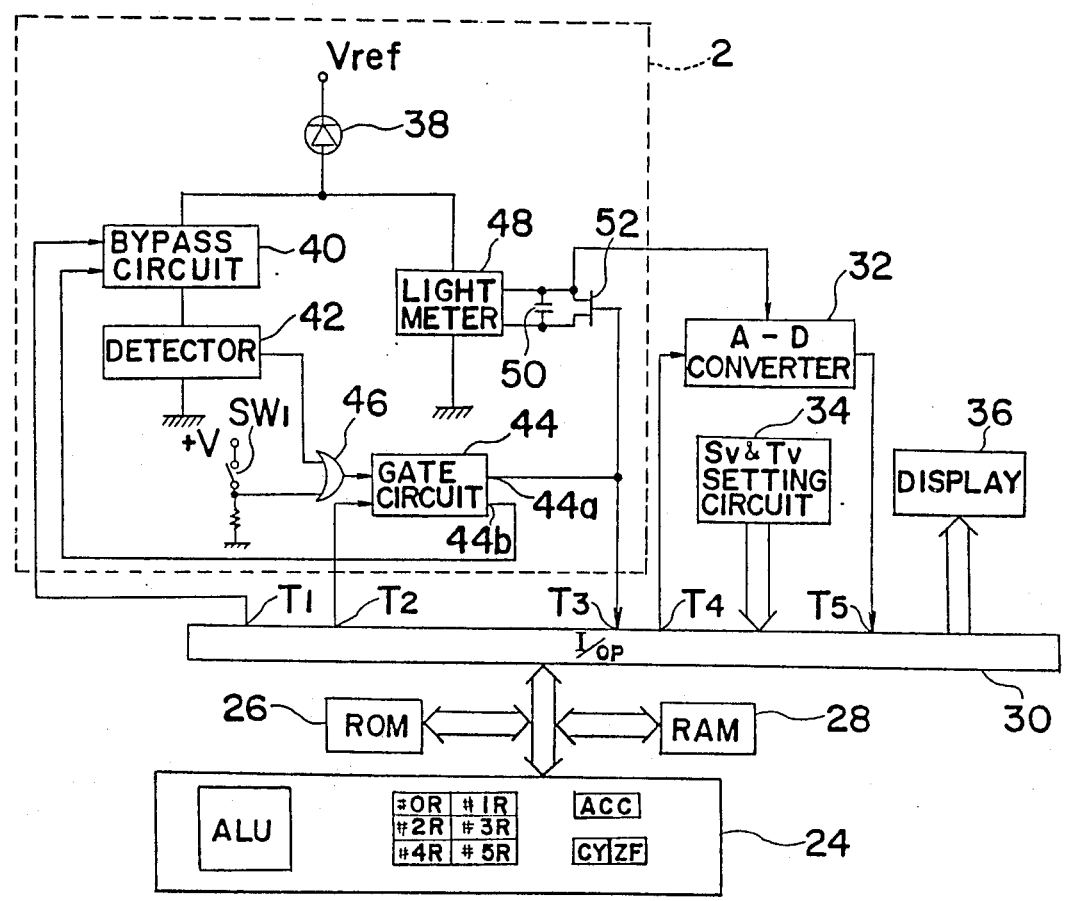
FIG. 2 is a block diagram showing one embodiment for carrying out the system shown in FIG. 1.

Referring to FIG. 2, there is shown one embodiment of the calculating device for calculating the exposure value expressed in terms of the APEX system in the matter described above. The device comprises a microcomputer having a data processor or central processor unit 24, read-only memory 26, randam access memory 28 and input and output terminal unit 30 including terminals T1 to T5. This microcomputer consists of known elements such as Intel MCS 80/85, a product of Intel Co., Ltd., U.S.A. The device further comprises the A-D converter 32, a film sensitivity Sv and shutter speed Tv information setting circuit 34 and a display unit 36 which are coupled to the microcomputer. The light value detector 2 described above comprises a light receiving element 38 such as photodiode for producing a pulse signal therefrom, a bypass circuit 40 connected to the light receiving element 38, a detector 42 connected to the bypass circuit 40 for determining the step-up of the pulse signal produced from the light receiving element 38, a gate circuit 44 connected to the detector 42 through an OR element 46, and a light meter 48 connected to the light receiving element 38 for measuring the light value of the received light. The light meter 48 is coupled with a capacitor 50 which is in turn connected to a field effect transistor 52. The operation of the light value detector 2 is described hereinbelow.

When a strobe (not shown) is flashed, the light receiving element 38 produces a pulse having a pulse duration coinciding with the flashing time and an amplitude corresponding to the brightness of the received light. The pulse is first directed to the bypass circuit 40. The pulse directed to the bypass circuit 40 is further fed to the detector 42. Upon detection of the step-up of the pulse, the detector 42 actuates the gate circuit 44 to produce a low level signal from the outputs 44a and 44b thereof. The low level signal produced from the output 44b of the gate circuit 44 is fed to the bypass circuit 40 for preventing further transmission of the pulse through the bypass circuit 40 and the output 44a is fed to the transistor 52 to turn it off. On the other hand, the pulse is directed to the light meter 48 and, in turn, to the capacitor 50. However, since the transistor 52 is turned off at the moment of step-up of the pulse by the low level signal produced from the output 44a of the gate circuit 44, the capacitor 50 starts to receive a charge from the pulse signal applied thereto from the light meter 48. The low level signal produced from the output 44a of the gate circuit 44 is also applied to the micro-computer through the input terminal T3 for causing the micro-computer to count a predetermined period of time $2^{-Tv'}$, which has previously been recorded in the read-only memory 26. After counting the predetermined time $2^{-Tv'}$, the computer produces low and high level signals from the terminals T1 and T2, respectively, for causing the bypass circuit 40 to transmit the signal from the light receiving element 38 therethrough to the detector 42. In other words, the bypass circuit 40 prevents the transmission of signal therethrough for a time interval of $2^{-Tv'}$, while the light meter 48 receives the pulse from the light receiving element 38 during said time interval of $2^{-Tv'}$. Since the predetermined time $2^{-Tv'}$ is so selected as to be no shorter than the duration of the flash of the strobe, the pulse of current caused by the flashing of the strobe is entirely charged in the capacitor 50. Since the amplitude of the pulse signal is proportional to the brightness of the received light, it will be understood that the total electric charge placed on the capacitor 50 is proportional to $2^{Bv} \times 2^{-Tv'}$. Therefore, the voltage produced across the capacitor 50 is proportional to the value $Bv-Tv'$, as is so disclosed in Japanese Patent Publication No. 28038/1975 assigned to the same assignee as the present invention. The voltage $Bv-Tv'$ is applied to the A-D converter 32 for obtaining a digital value of $Bv-Tv'$ which is in turn fed to the computer.

The central processing unit 24 of the computer includes an arithmetic and logic unit ALU, an accumulator ACC, a carry flag CY, a zero flag ZF, six registers #0R, #1R, #2R, #3R, #4R, #5R, and other parts such as a program counter, instruction decoder, timing controller etc., the details of which are herein omitted for the sake of brevity. The registers #0R to #5R are provided for temporarily memorizing the values while the flag CY is provided for indicating a negative value of the memorized value and the flag ZF is provided for indicating a zero value of the memorized value.

The digital value $Bv-Tv'$ obtained from the A-D converter 32 is moved to the register #5R and is added in the register #5R to the digital value Sv which has been moved to the randam access memory 28 from the information setting circuit 34. This addition can be expressed as follows:

$$Bv-Tv'+Sv=Av-Sv+Sv=Av=Av2 \qquad (11).$$

Thereafter, the value Av2 held in the register #5R is compared with the value Av1 which has been held in the register #0R. When Av1>Av2, the difference $N=Av2-Av1$ is calculated for obtaining the value $\log_2(1+2^N)$. This value is added to the larger one of the two values Av1 and Av2. In this case, the calculated value $\log_2(1+2^N)$ is added to the value Av1, thus obtaining the value $Av1+\log_2(1+2^N)$ which is substantially equal to the value Avx as can be understood from the equation (7). The summed value is moved to the register #0R as a renewed value of Av1 for use during the next calculation cycle. A similar operation is carried out when Av1<Av2. In this case, the difference $M=Av1-Av2$ is employed for calculating the value $\log_2(1+2^M)$ which is added to the larger value Av2 for obtaining the summed value Avx. The value Avx obtained from the final cycle of calculation is used for calculating a value $\sqrt{2^{Avx}}$ which is equal to the f/stop value. The thus obtained f/stop value can be used for controlling an aperture size of a camera (not shown) carrying the above described calculating device and for visually exhibiting the f/stop value in the display unit 36.

Figure 3:
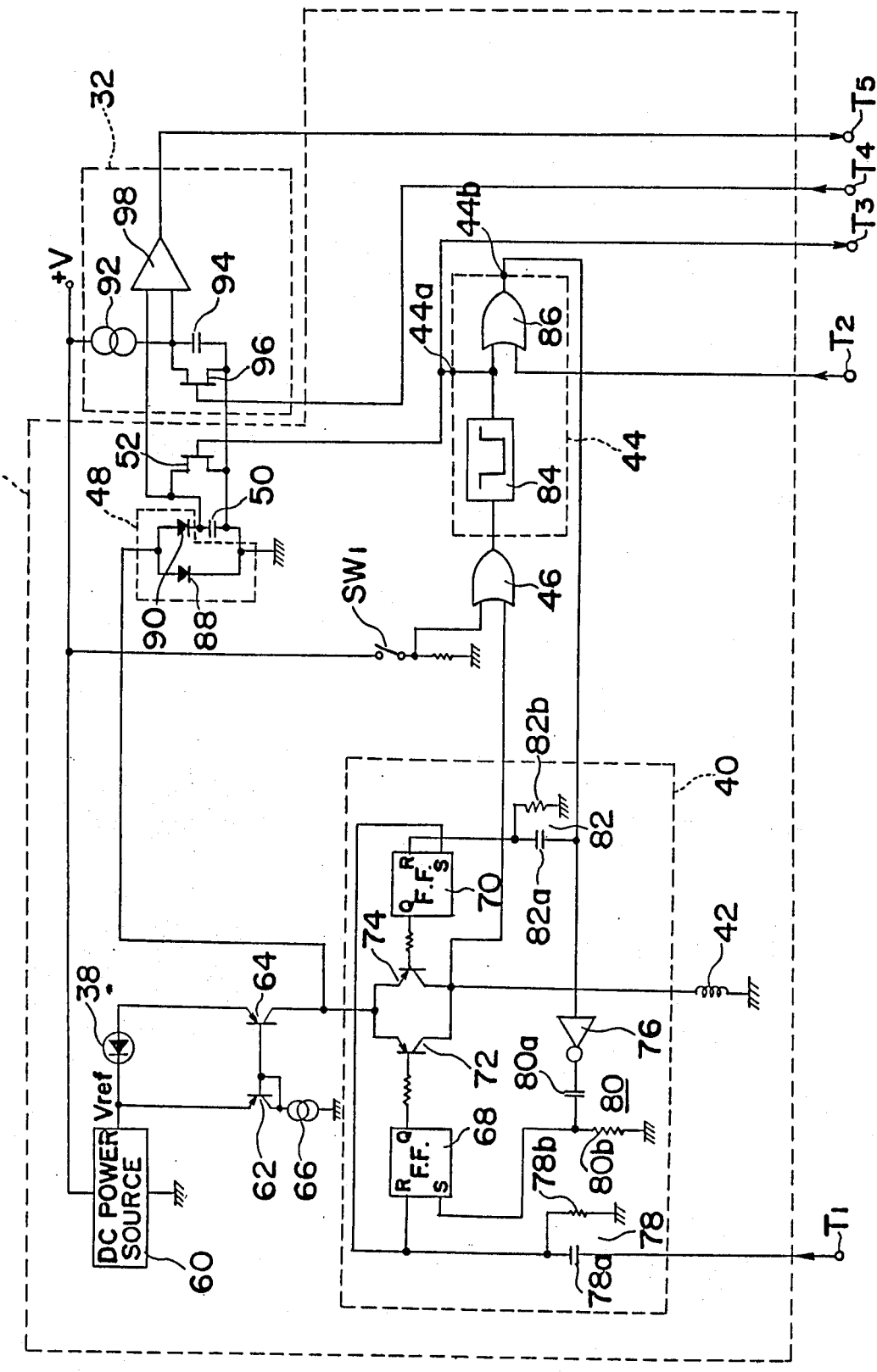
FIG. 3 shows the details of portions of the circuit shown in FIG. 2.

Referring to FIG. 3, there is shown one example of a current diagram which is connected to the micro-computer and which includes the light value detector 2 and the A-D converter 32. A reference numeral 60 designates a DC power source for operating the circuitry. A pair of transistors 62 and 64 and a constant current source 66 are employed for normally providing a constant voltage across the light receiving element 38.

The bypass circuit 40 comprises two flip-flop circuits 68 and 70 each having a set terminal S, a reset terminal R and an output Q, a pair of transistors 72 and 74 having their emitters connected to each other the collectors thereof also connected to each other, an inverter 76 and three differential circuits 78, 80 and 82 each including a respective capacitor 78a, 80a and 82a and a respective resistor 78b, 80b and 82b. The bases of the transistors 72 and 74 are connected to the Q outputs of the flip-flops 68 and 70, respectively, through suitable resistors. The reset input R of the flip-flop 68 and the set input S of the flip-flop 70 are connected to each other and in turn connected through the differential circuit 78 to the terminal T1 of the micro-computer. The set input S of the flip-flop 68 is connected through the differential circuit 80 and the converter 76 to the output 44b of the gate circuit 44. Similarly, the reset input R of the flip-flop 70 is connected through the differential circuit 82 to the output 44b of the gate circuit 44. The emitters of the transistors 72 and 74 are connected through the transistor 64 to the light receiving element 38 and the collectors thereof are connected to one input of the OR element 46 and also to a coil constituting the detector 42. The coil 42 produces a pulse in response to an abrupt change of a current flowing therethrough.

The gate circuit 44 comprises a monostable multivibrator 84 and an OR element 86 with the input of the monostable multivibrator 84 being connected to the output of the OR element 46 and the output of the monostable multivibrator 84 being connected to one input of the OR element 86 and also to the output 44a of the gate circuit 44. The other input of the OR element 86 is connected to the terminal T2 of the microcomputer.

The light meter 48 comprises diodes 88 and 90, the diode 90 being connected in series with the capacitor 50 and the diode 88 being connected in parallel to the diode 90 and capacitor 50. One end of the parallel connection is connected through the transistor 64 to the light receiving element 38 while the other end thereof is grounded.

The A-D converter 32 comprises a constant current source 92, a capacitor 94, a field effect transistor 96 and a comparator 98, the capacitor 94 being connected across the source and drain of the FET 96. The gate of the FET 96 is connected to the terminal T4. The current source 92 is connected between the DC power source 60 and the FET 96 which is in common with one input of the comparator 98. The other input of the comparator 98 is connected to the FET 52 described above. The gate of the FET 52 is connected to the terminal T3 while the output of the comparator 98 is connected to the terminal T5.

The operation of the light value detector 2 shown in FIG. 3 is described hereinbelow.

Initially, the terminals T1, T2 and T4 are set to high, low, and high level signals, respectively. Therefore, by the high level signal established at the terminal T1, the flip-flop 68 is reset while the flip-flop 70 is set to switch the transistors 72 and 74 on and off, respectively. Upon receipt of light, the light receiving element 38 produces a pulsating signal which is directed through the transistors 64 and 72 to the OR element 46 which in turn applies a high level signal to the monostable multivibrator 84. The monostable multivibrator 84 which has been producing a high level signal now produces a low level signal upon receipt of a high level signal from the OR element 46. The low level signal thus produced from the monostable multivibrator 84 is applied to the gate of the FET 52 for making the capacitor 50 ready for being charged and, at the same time, is applied to the OR element 86. Therefore, the OR element 86 produces a low level signal which is inverted into a high level signal in the inverter 76 for setting the flip-flop 68, which in turn turns the transistor 72 off. Accordingly, the pulse signal generated from the light receiving element 38 is directed through the transistor 64 and light meter 48 to the capacitor 50 wherein the pulse current is charged. The start of charging of the capacitor 50 is identified in the micro-computer by the receipt of a low level signal at the terminal T3. Upon receipt of a low level signal at the terminal T3, the micro-computer starts to count the time interval $2^{-Tv'}$. After the count has been completed, the micro-computer produces low and high level signals from the terminals T1 and T2, respectively. Therefore, the OR element 86 produces a high level signal to reset the flip-flop 70. Accordingly, the transistor 74 is turned on for allowing signals to pass therethrough.

After counting the time interval $2^{-Tv'}$, the computer produces a low level signal from the terminal T4 for turning the FET 96 off. Accordingly, the capacitor 94 starts to be charged by a constant current generated from the constant current source 92 to gradually increase the voltage across the capacitor 94. Said voltage across the capacitor 94 is compared with the voltage across the capacitor 50 in the comparator 98. When the voltage across the capacitor 94 reaches the voltage across the capacitor 50, the comparator 98 produces a high level signal therefrom and supplies it to the terminal T5 of the computer. In the meantime, the computer counts the time between the moment of production of the low level signal from the terminal T4 and the moment of receipt of the high level signal at the terminal T5. The length of this time period is converted into a digital value which is substantially proportioned to the voltage across the capacitor 50 and, in turn, to the APEX value Av1 resulting from the received light.

It is to be noted that the monostable multivibrator 84 is arranged to have a long pulse duration sufficient to maintain the FET 52 in the OFF state to allow the capacitor 50 to be charged until the comparator 98 produces the high level signal.

Figure 4B:
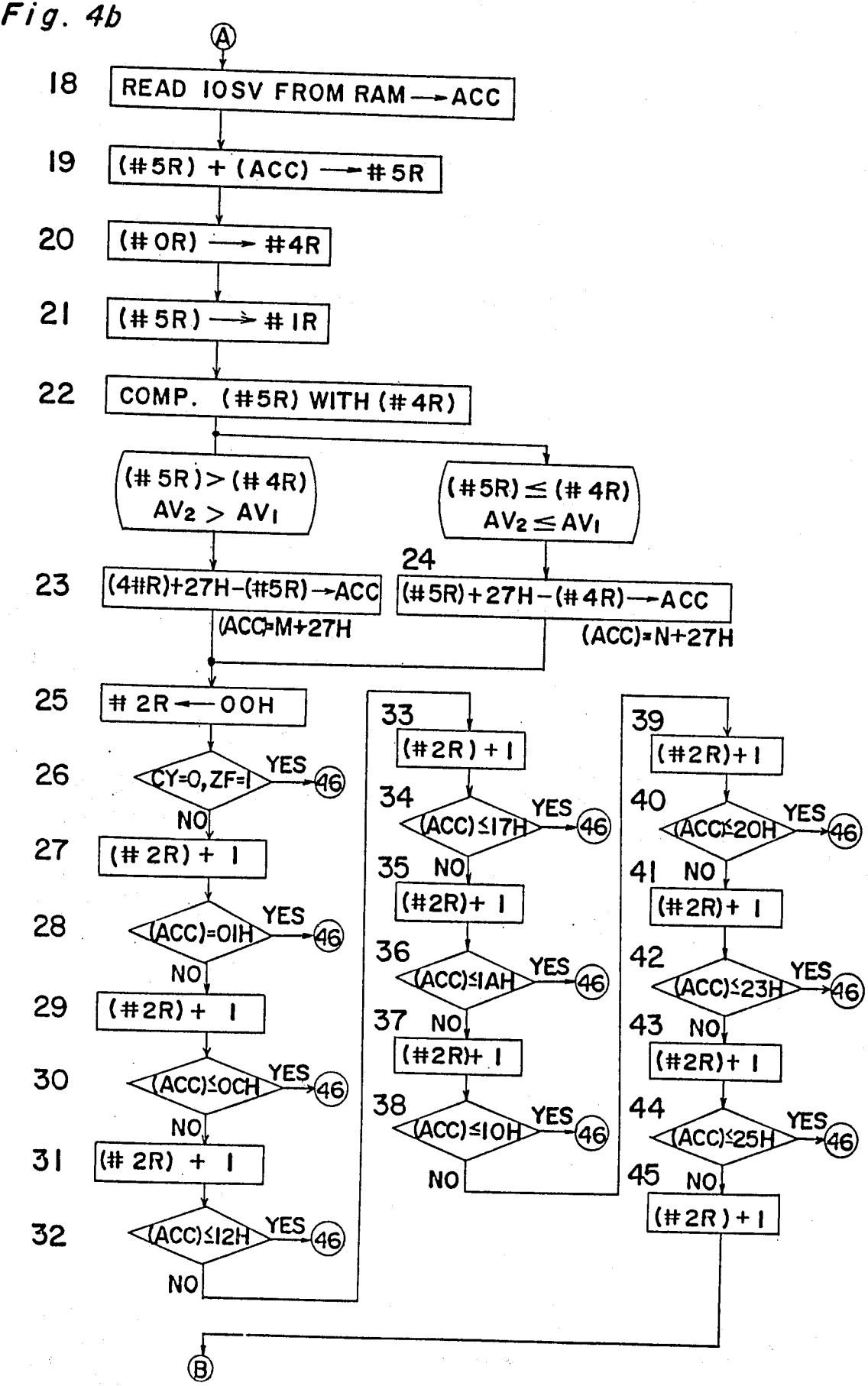
Figure 4C:
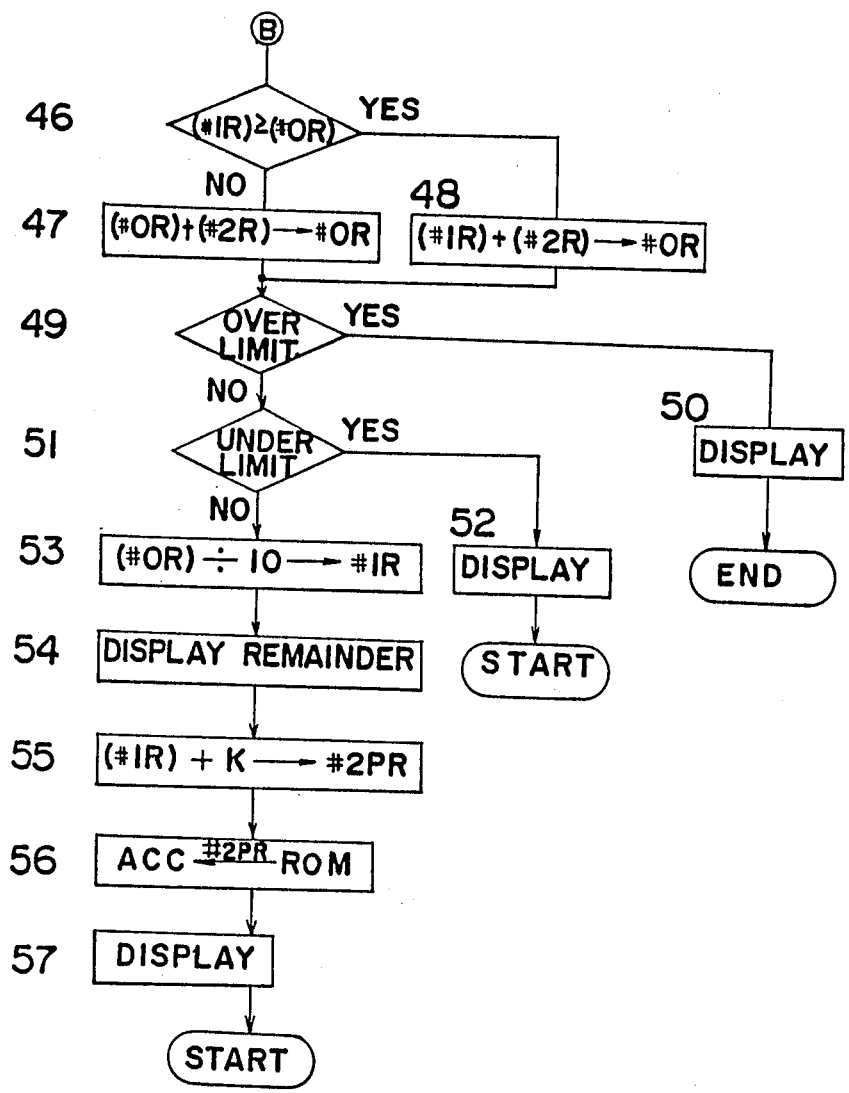

The further operation for carrying out the calculation takes place in the computer. One operation of the computer is described hereinbelow with reference to the flow chart shown in FIGS. 4a, 4b and 4c.

Starting from the very beginning, the computer sets the terminals T1, T2 and T4 to high, low and high, respectively, in a step 1. The APEX value Sv corresponding to the film sensitivity and the APEX value Tv corresponding to the shutter speed are fed into the computer from the information setting circuit 34 in the step 2 for transmitting the value 10Sv to the random access memory 28 in the step 3. Thereafter, the light receiving element 38 receives a flash of light and causes the OR gate 46 to produce a high level signal and, in turn, the monostable multivibrator 84 to produce a low level signal. Thus, the output 44a of the gate circuit 44 produces a low level signal which is fed to the terminal T3 of the computer. Upon receipt of the low level signal (step 6), the computer starts to count the time interval $2^{-Tv'}$ which has already been stored in the registor #5R in the previous step 4. Since the time necessary for the next statement is known, this time counting is effected in the following steps 7 to 11 in a manner described hereinbelow.

A predetermined value 0αH is set in the register #4R in the step 7 for sequentially subtracting value 1 from the content of the register #4R until the content of the register #4R is reduced to zero. The reference character H used in the value 0αH and in the other values given hereinafter indicates that the value is presented in the hexadecimal numbering system. This reduction to zero is identified by the establishment of the zero flag (ZF=1), and is used to start the subtraction of value 1 from the content of the register #5R, that is, data indicative of $2^{-Tv'}$. The repetition of the above described procedure causes the content of the register #5R to become zero. The time required for the content of the register #5R to become zero is so selected as to be equal to the time interval $2^{-Tv'}$.

After counting the time interval $2^{-Tv'}$, the computer sets the terminals T1, T2 and T4 to low, high and high, respectively, for holding the charged voltage across the capacitor 50 and for allowing a further signal from the light receiving element 38 to be transmitted through the bypass circuit 40. The voltage across the capacitor 50 is converted into a value in the following steps 13 to 17.

A predetermined value β1β2H is set in the register #5R (step 13) and, thereafter, the computer sets the terminal T4 to low for allowing the capacitor 93 to be changed by current until the voltage across the capacitor 94 reaches the voltage across the capacitor 50. When the voltage across the capacitor 94 reaches the voltage across the capacitor 50, the comparator 98 produces a high level signal (step 17) and supplies it to the terminal T5. In the steps 15, 16 and 17, the content of the register #5R sequentially has subtracted the value 1 at a predetermined time rate until the terminal T5 is provided with the high level signal. Therefore, the total value subtracted from the content of the register #5R which is digitally stored in the computer is substantially proportional to the voltage across the capacitor 50, that is, in relation to the APEX value Bv−Tv'. It is to be noted that, for the purposed of calculation and for the display, the final value set in the register #5R is 10·(Bv−Tv'+r) in which r is a predetermined value added for preventing the content of register #5R from being presented as a negative value.

In the next step 18 (FIG. 4b), the value 10Sv is moved from the random access memory 28 to the accumulator for renewing the content of the register #5R with the sum of the present content of the register #5R and the content of the accumulator. Therefore, after the step 19, the content of the register #5R is equal to 10·(Bv−Tv'+r)+10Sv=10·Av2. Since the register #0R has been storing the APEX value 10·Av1 obtained from the previous cycle of operation, the comparison between the values 10·Av2 is carried out in the following steps starting from the step 20.

In the step 20, the value 10·Av1 in the register #0R is moved to the register #4R while, in the step 21, the value 10·Av2 in the register #5R is moved to the register #1R. These two values in the register #5R and #4R are compared with each other in the step 22 for obtaining the difference therebetween. When Av2>Av1, the following calculation:

(content of the register #4R)+27H−(content of the register #5R)  (12)

is carried out and the result is set in the accumulator. On the other hand, when Av2<Av1, the following calculation:

(content of the register #5R)+27H−(content of the register #4R)  (13)

is carried out and the result is set in the accumulator. In the above two equations (12) and (13), the value 27H is added for preventing the value in the accumulator from being a negative value. The difference N from either one of the above two calculations is used for calculating a value given by the following formula:

$$\log_2(1+2^N) \qquad (14).$$

The following Table 1 shows the relationship between the acquired difference N and the value given by the formula (14).

TABLE 1

| Difference N in APEX value | 10 · (N + 3.9) | 10 · log₂(1 + 2^N) |
|---|---|---|
| below −3.9 | below 00H | 00H |
| −3.8 | 01H | 01H |
| −3.7 ~ −2.7 | 02H ~ 0CH | 02H |
| −2.6 ~ −2.1 | 0DH ~ 12H | 03H |
| −2.0 ~ −1.6 | 13H ~ 17H | 04H |
| −1.5 ~ −1.3 | 18H ~ 1AH | 05H |
| −1.2 ~ −1.0 | 1BH ~ 1DH | 06H |
| −0.9 ~ −0.7 | 1FH ~ 20H | 07H |
| −0.6 ~ −0.4 | 21H ~ 23H | 08H |
| −0.3 ~ −0.2 | 24H ~ 25H | 09H |
| −0.1 ~ −0.0 | 26H ~ 27H | 0AH |

In Table 1, since the numbering in the second and third columns is in the hexadecimal numbering system, the digits thereof are 0, 1, 2, 3, 4, 5, 6, 7, 7, 8, A, B, C, D, E, F.

The difference value is sequentially compared with the value of the central column of Table 1 from top to bottom. After each comparison, the value in the register #2R is stepped up from 0 to 0AH. For example, when the difference N is −3.8, the value set in the accumulator is 01H. This value 01H is first compared with the value 00H given at the top of the central column of Table 1. When the above described first comparison is carried out, a value 00H is set in the register #2R in the step 25. Since the value 01H set in the accumulator does not match with the first value 00H at the top of the central column, the zero flag is not produced in the discrimination step 26 and, as a consequence, the procedure is continued to the next successive step 27 in which the value in the register #2 R is increased by 1. Then, the value 01H contained in the accumulator is compared with the second value 01H of the central column in Table 1. Since the value 01H set in the accumulator matches with the second value, the discrimination in the step 28 is satisfied and the operation skips from step 28 to step 46.

In the case where the difference N is between −3.7 and −2.7, the discrimination of the step 30 is satisfied and the operation skips the steps from step 30 to step 46. After each step of discrimination, the content of the register #2R is counted up one by one, so that the content of the register #2R is 02H at the step 30. This value of the register #2R coincides with the value of the equation (14), as can be seen from Table 1, and corresponds to the value 10·(Avx+r).

In a similar manner, when the difference N is between −2.6 and −2.1, the content of the register #2R will be raised to 03H. And, likewise, when the difference N is between −0.3 and −0.2, the content of the register #2R will be raised to 09H. Similarly, when the difference N is between −0.1 and 0, the content of the register #2R will be 0AH.

When the micro-computer is in the first cycle of the operation, that is, the measurement of the first flash of light, no particular light information is stored in the register #0R. Therefore, the content of the register #0R, as well as the register #4R, is zero, in this case.

Since the content of the register #5R is arranged to be 10(Av2+r) in the step 22, wherein 4≧3.9, the result of the calculation in the step 23 would result in a negative value. More particularly, the result of the step 23 would be $M-27H=00H+27H-10(Av2+r)\geq 0$. Thus, the procedure would skip from the step 26 to the step 46 and further to the step 48 in which the result of the calculation presented as $10(Avx+r)32\ 10(Av2+r)+00H$ is applied to the register #0R. Therefore, after the first cycle of operation, the register #0R carries the value $10(Av2+r)$.

In the cycle of operations preceding the first skip, since the calculation carried out in the step 23 is $(Av1+r)+ 27H-10(Av2+r)$, the value r does not have any influence on the calculated value.

At the step 46, the content of the register #0R which is the result of the previous cycle of operation is compared with that of the register #1R containing the APEX value Av2. Then, in the steps 47 and 48, the larger one of the two values contained in the registers #0R and #1R is added to the content of the register #2R while the sum thereof is moved to the register #0R for the renewal thereof. The result of the thus obtained value in the register #0R is examined to determine whether it is within upper and lower limits in the following steps 49 and 51. When the APEX value in the register #0R is found to be over the limit, it is understood that more than enough light is supplied. Therefore, in the step 50, a display indicating light above the upper limit is actuated and, at the same time, the operation of the computer is stopped. On the other hand, when the APEX value in the register #0R is found to be under the lower limit, a display indicating light under the lower limit is actuated and, at the same time, the procedure is returned to the start for the calculation of further light in succeeding cycles of operation.

When the light value is appropriate, that is, within the range, the content of the register #0R is divided by 10 in the next succeeding step 53 in which the quotient is used for displaying one of the f/stop numbers in the conventional values which are 1, 1.4, 2.8, 4.0, 5.6 8.0, 11, 16, 22, 32, and so on, while the remainder is used for displaying a number representing one of ten steps between the neighboring two f/stop numbers for a precise indication of the light value. For this purpose the remainder itself is directly displayed in the step 54, while the quotient Q is used, in the steps 55 and 56, for calculating the value $\sqrt{2^Q}$ which is substantially equal to one of the above described known values. In the step 55, the quotient Q is added to a predetermined value K and the sum thereof used as an address number is applied to a register #2PR consisting of registers #2R and #3R. Than data contained in the read-only memory 26 at a place identified by the address number in the register #2PR is moved to the accumulator for displaying said data in the display unit 36. Thereafter, the procedure returns to start, thus completing one cycle of operation in the microcomputer. A similar cycle of operation is repeated again for another single firing of the strobe.

The f/stop number finally obtained after a number of cycles of operation provides an appropriate f/stop number for taking a photograph with all the strobes being lighted at the same time.

Figure 5:
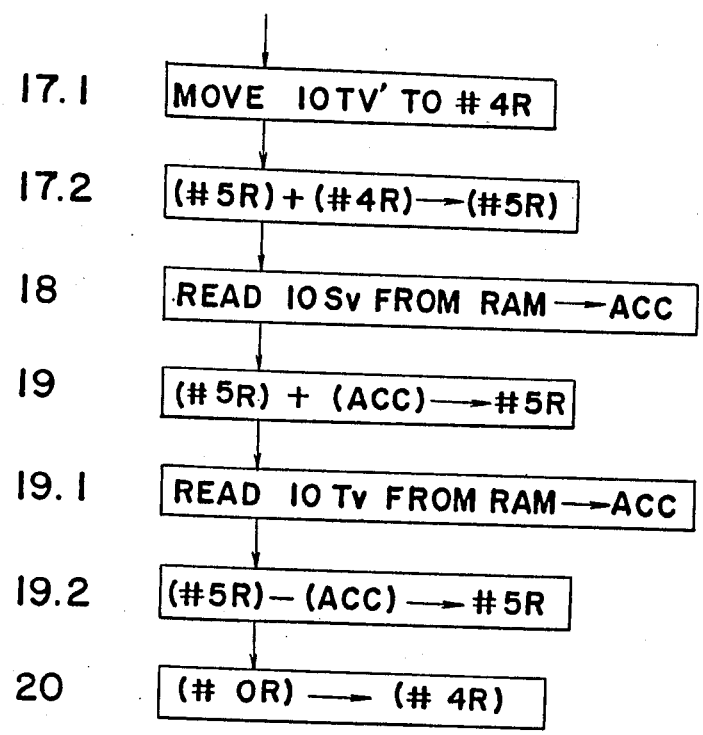
FIG. 5 is a flow chart to be employed for carrying out a similar calculation.

The foregoing description is directed to the steps for measuring the APEX value for a plurality of strobes being actuated for taking one photograph. However, the description hereinbelow is directed to the steps for measuring the APEX value for a multiple exposure taken in natural constant light. First, a switch SW1 (FIGS. 2 and 3) connected to the OR gate 46 is turned on for producing low and high level signals from the terminals 44a and 44b of the gate circuit 44. Thereupon, the capacitor 50 is temporarily charged with the current obtained form the light receiving element 38 during the predetermined time period of $2^{-Tv'}$. Since the value Tv' is temporarily fixed in the computer, this value is replaced with a value Tv corresponding to the actually set shutter speed in the additional steps added after the step 17 and after the step 19, as shown in FIG. 5. In the steps 17.1 and 17.2 added after the step 17, the value 10Tv' is moved to the register #4R and is added to the content of the register #5R which is now equal to $10\cdot(Bv-Tv')$, and the sum is used for the renewal of the register #5R. Therefore, the content of the register #5R after the step 17.2 is 10Bv. The content of the register #5R is further renewed to the value $10(Bv+Sv)$ in the step 19 and is still further renewed to the value $10(Bv+Sv-Tv)$ in the step 19.2, so that the content of the register #5R is substantially equal to 10Av2.

Figure 6:
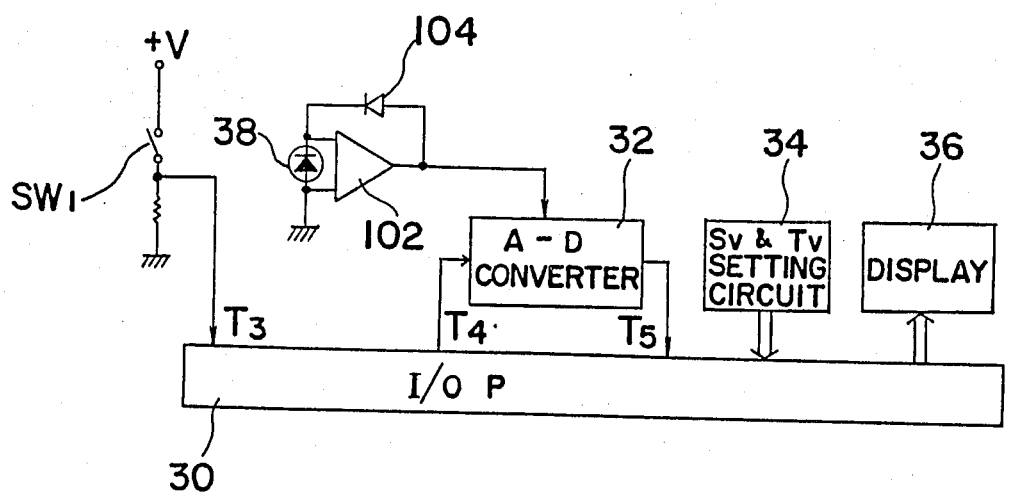
FIG. 6 is a block diagram similar to FIG. 2, but particularly showing another embodiment.

Referring to FIG. 6, there is shown a block diagram of another embodiment of the calculating device for calculating the exposure value. Although the embodiment shown in FIG. 2 detects the light information by the electric charge in the capacitor 50, this embodiment detects the instantaneous light information and is particularly applicable for use in obtaining an appropriate aperture value for a multiple exposure under natural constant daylight. In comparison with the embodiment shown in FIG. 2, this embodiment does not include the bypass circuit 40, detector 42, OR element 46, gate circuit 44 and FET 52, and the switch SW1 is directly connected to the terminal T3. According to this embodiment, an operational amplifier 102 is connected across the light receiving element 38 and a logarithmic supressing diode 104 is connected across the input and output of the amplifier 102. When the terminal T3 becomes high as a result of closure of the switch SW1, the terminal T4 produces a low level signal therefrom to start actuating the A-D converter 32. Thereafter, the operation thereof follows the flow chart beginning from step 17.1 of FIG. 5 and leading from 20 of the same FIG. to 21 of FIG. 4b.

Although the present invention has been fully described by way of examples with reference to the accompanying drawings, it is to be noted that various changes and modifications will be apparent to those skilled in the art. For example, the computer program which has been described for obtaining the aperture APEX value can be arranged to obtain other APEX values such as shutter speed APEX value Tv or film sensitivity APEX value Sv or luminance APEX value Bv or exposure value Ev, since the relations among these values are quite similar to each other. Furthermore, the calculating system of the present invention can be employed in a color meter of a type described hereinbelow.

In a color meter, it is required to detect the ratio of luminance of a particular color to the total luminance. For example, when values Ax, Ay and Az obtained from three different light receiving elements responsive to different colors are defined as indicating the luminance of the three colors such as three principle colors, it is necessary for evaluating the color to obtain the ratios Ax/At, Ay/At and Az/At wherein $At=Ax+Ay+Az$. Since the values of each of the signals Ax, Ay and Az vary from a very small number to a very large number, it is preferable to express the values in the logarithmic values. Thus, $At=e^{ax}+e^{ay}+e^{az}=e^{at}$, wherein $e^{ax}=Ax$, $e^{ay}=Ay$, $e^{az}=Az$.

In this case, the desired values may be calculated as follows:

$$e^{ax-at} = \frac{Ax}{At} (x),\ e^{ay-at} = \frac{Ay}{At} (y),\ a^{az-at} = \frac{Az}{At} (z).$$

However, it has been quite difficult to calculate the value at by using the values ax, ay and az. According to the present invention, since the relation between the values ax, ay, az and at is similar to the relation between the values Avi and Avx in the equation (2), the program for calculating the APEX value can be used for calculating at, which is necessary to obtain the values Ax/At, Ay/At and Ax/At.

Therefore, unless such changes and modifications depart from the true scope of the present invention, they should be construed as being included therein.

What is claimed is:

1. A system for processing a plurality of signals used for calculating the sum of a plurality of pieces of light information in logarithmic value, said system comprising:
   a means for respectively obtaining pieces of light information through individual measurements;
   a means for producing a first signal indicative of a logarithmic value of one piece of light information;
   a storing means for storing a second signal;
   a means for producing a third signal indicative of a difference between said first and second signals;
   a means responsive to said third signal for producing a fourth signal which is in a predetermined relationship with respect to said third signal; and
   a means for adding said fourth signal to one of said first and second signals, the sum of said addition being applied to said storing means for storage as said second signal.

2. A system as claimed in claim 1, wherein said light information is given in an APEX system.

3. A system as claimed in claim 1, wherein said fourth signal has a value in the form of:

$$\log_2 (1+2^N)$$

wherein N corresponds to said third signal.

4. A system as claimed in claim 1, wherein said fourth signal producing means comprises a means for ranking the value of said third signal to produce said fourth signal, wherein said value is inherent to the rank of said value of said third signal.

5. A system as claimed in claim 1, further comprising a means for determining which of said first and second signals is larger.

6. A system as claimed in claim 5, further comprising a means responsive to said determining means for defining which of said first and second signals is to be subtracted from the other.

7. A system as claimed in claim 6, wherein said adding means adds said fourth signal to the larger of said first and second signals.

8. A system as claimed in claim 1, further comprising a means for displaying said sum.

9. A method for processing a plurality of signals used for calculating the sum of a plurality of pieces of light information in logarithmic value, said processing method comprising:
   a step of respectively obtaining said pieces of light information through individual measurements;
   a first step of producing a first signal indicative of a logarithmic value of a first piece of light information and storing the first signal in a memory means;
   a second step of producing a second signal indicative of a logarithmic value of a second piece of light information;
   a third step of producing a third signal indicative of a difference between the second signal and the signal stored in the memory means;
   a fourth step of producing, in response to the third signal, a fourth signal having a predetermined relationship with respect to the third signal; and
   a fifth step of adding said fourth signal to one of the second signal and the signal stored in the memory means so as to produce a fifth signal indicative of the sum thereof.

10. A method as claimed in claim 9, further comprising a sixth step of replacing the first signal by the fifth signal as the stored content of the memory means.

11. A method as claimed in claim 9, wherein said third step comprises a step of determining which of the second signal and the signal in the memory means is larger.

12. A method as claimed in claim 11, wherein said third step comprises a step of defining which one of the second signal and the signal stored in the memory means is to be subtracted from the other in response to the determining step.

13. A method as claimed in claim 12, wherein said fifth step adds said fourth signal to the larger one of the second signal and the signal stored in the memory means.

14. A method as claimed in claim 10, further comprising the steps of repeating the second to sixth steps for effecting an additional production of light information as a new second signal.

15. A method as claimed in claim 9, further comprising a step of displaying the sum.

16. A system for processing a plurality of signals used for calculating the sum of a plurality of pieces of light information in logarithmic value, said system comprising:
   a means for respectively obtaining said pieces of light information through individual measurements;
   a light measuring means for measuring light and for producing signals respectively indicative of logarithmic values of indicative pieces of light information;
   a digital processor for processing said signals from said light measuring means so as to calculate a logarithmic value of the sum of said pieces of light information; and
   a display means connected to said digital processor for displaying a value corresponding to said logarithmic value of said sum of said pieces of light information.

17. A system as claimed in claim 16, wherein said light measuring means comprises a storing means, and a means operatively connected to said storing means for producing a signal indicative of a logarithm of the quantity of received light as the signal to be applied to said digital processor, and a means operatively connected to said storing means for clearing said storing means.

18. A system as claimed in claim 16, wherein said light measuring means includes a means for producing a signal indicative of a logarithm of the intensity of received light as the signal to be applied to said digital processor.

19. A system as claimed in claim 18, further comprising a means responsive to a step-up of a pulse of the received light for ordering said light measuring means to start the light measurement.

20. A system as claimed in claim 19, further comprising a manually operable switch for ordering said digital processor to start the light measurement.

* * * * *